United States Patent
Ginn

[19]

[11] Patent Number: 6,052,723
[45] Date of Patent: Apr. 18, 2000

[54] METHOD FOR AGGREGATE CONTROL ON AN ELECTRONIC NETWORK

[75] Inventor: Michael R. Ginn, San Francisco, Calif.

[73] Assignee: Stockmaster.com, Inc., Cupertino, Calif.

[21] Appl. No.: 08/900,040

[22] Filed: Jul. 24, 1997

Related U.S. Application Data

[60] Provisional application No. 60/022,823, Jul. 25, 1996.

[51] Int. Cl.[7] ........................................ G06F 13/10
[52] U.S. Cl. .......................... 709/223; 709/224; 709/225; 709/226
[58] Field of Search .................................. 709/223, 224, 709/225, 226

[56] References Cited

U.S. PATENT DOCUMENTS 5,421,011  5/1995  Camillone et al. .
5,822,535  10/1998  Takase et al. .......................... 709/226

*Primary Examiner*—Krisna Lim
*Attorney, Agent, or Firm*—Townsend and Townsend and Crew LLP

[57] ABSTRACT

A method for controlling an electronic network of a plurality of users includes the steps of creating a group of users from the plurality of users, determining a policy for the group of users, the policy including decision criteria and directive actions, receiving input from at least one user within the group of users, determining whether a decision criterion is satisfied in response to the input, and performing a directive action when the decision criterion is satisfied.

23 Claims, 12 Drawing Sheets

| | |
|---|---|
| 100 | Insert or Delete a User |
| 101 | Assert a Fact |
| 102 | Retract a Fact |
| 103 | Switch a Unit |
| 104 | Print a Message to Specific Units |
| 105 | Collect Decisions from Specific Units |
| 106 | Select a New Policy |
| 107 | Select a Proxy |
| 108 | Compute Mathematics |
| 109 | Terminate |
| 110 | Satisfy Precondition |
| 32 | Create Groups |
| 33 | Allocate Resources |
| 34 | Propagate Messages |
| 35 | Update Points |
| 36 | Update Goal |

METHOD FOR AGGREGATE CONTROL ON AN ELECTRONIC NETWORK

This Appln claims the benefit of U.S. Provisional No. 60/022,823 filed Jul. 25, 1996.

COPYRIGHT NOTICE

A portion of the disclosure of this patent document contains material which is subject to copyright protection. The copyright owner has no objection to the facsimile reproduction by anyone of the patent document or the patent document or the patent disclosure as it appears in the Patent and Trademark Office patent file or records, but otherwise reserves all copyright rights whatsoever.

BACKGROUND OF THE INVENTION

The present invention relates generally to computer based tools to help groups work together, and more specifically, to a method for aggregate control of and by a group of people through the use of an electronic computer network.

Computer software for helping groups work together has been known for at least twenty years. Electronic mail, such as that provided by cc:Mail, provides a basic digital messaging capability. Lotus Notes™, the first program geared to help groups to work together to gain wide acceptance, has made it possible to automate many office tasks.

However, there are problems which up until now have not been resolved. Here is the key problem:

How can a group of people interact on a computer system so that control is distributed among that group of people, rather than being controlled by a single appointed individual?

This question raises a host of related questions for people working together on a network:

1. Of a large group of people on a particular service, how do you locate those with whom you would like to work together to achieve common goals?

2. On the Internet, and the Usenet specifically, people spend tremendous amounts of time arguing with each other on electronic bulletin boards, and very little time actually accomplishing proposed goals. How can a software application refocus this wasted effort toward something more productive?

3. On Usenet, people are more or less thrown together on a particular topic of discussion, regardless of their previous behavior on other topics. If they were rude or obnoxious in other areas, they have as significant a voice as someone who has been helpful on a topic for years. How can a software application remedy this situation?

4. How can the virtual world be linked with the real world, so that actions in the virtual world are more than "hot air" and have real-world ramifications?

5. How can someone reading an electronic bulletin board reduce the clutter of thousands of messages to get to the messages he or she is interested in, without yielding control to a single other individual, the dreaded "moderator"?

6. How can you tell whether you should trust another user you meet electronically on the Internet?

None of the software available today even attempts to provide solid answers to these questions. However, partial solutions have been proposed:

Lotus Notes™ allows a programmer to specify a specific signature path for a form to follow in getting sign-off throughout a corporation. This provides a limited capability for distributing control for passing messages; person C doesn't see a message unless person B signed it; person B doesn't see it unless person A signed it. This starts to solve the problem of how you can have a group of people control something on a computer, but falls short: the fixed signature path can interfere with the give and take that is often associated with revision. For example, if two VP's sign off and it goes to the president, but the president requests changes before the document can be signed, the signature path does not automatically capture the company's policy about whether or not to get signatures from the two VP's. As a result, Notes often ends up interfering with corporate policy rather than facilitating it.

Some commonly available software for electronic bulletin boards solicits ratings from users and shows entries with higher ratings more prominently. This helps filter messages without a moderator, but doesn't address the group control issue. Further, there are message rating systems currently available which let people supply ratings of each others' messages on a scale of 1 (worst) to 10 (best). Typically, the net result is that most messages receive a rating of about 3.5. Because of this, people who tend to write messages become demoralized, and move on to other forums.

Dating service programs group two people based upon how similarly they answer questions. This helps people wanting to date, but does little for larger groups, and doesn't address the group control issue.

SUMMARY OF THE INVENTION

According to the invention, a method is provided for aggregate control by two or more participants on an electronic network in which participants interface to the electronic network with input units and output units such as telephones, fax machines, and Personal Computers. Voice, text, and documents can be distributed to others who are able to receive the information directly; in some instances the information can also be stored in a central storage system for future use. The invention includes an automated moderator to control who has the "floor" at a particular point in time. The invention does this, for example, by switching one input unit to connect to all compatible output units; or by propagating digital messages originating with one person to the remainder of the participants.

The invention determines who should have the "floor" by following a policy. Robert's Rules of Order, a parliamentary set of procedures, is one example of a policy which can be deployed in the current invention using rules (see below). A mechanism for implementing several different kinds of policies is provided.

Additionally, the invention can use this aggregate decision policy to control the allocation of group resources, for example by implementing a group decision with the execution of a bank wire.

The invention can also use this aggregate decision policy to control the assignment and execution of group goals.

Additionally, the invention can use this aggregate decision policy to control the tracking of user's reputations on the invention, based on whether their actions are judged by others working with them to be deleterious or of great benefit.

The invention can also use this aggregate decision policy to determine to whom certain messages should be propagated, and by what process messages should go from a smaller number of people to a far greater number of people.

Additionally, the invention can even use this aggregate decision policy to control the adoption of new aggregate decision policies.

It is also very useful to use this invention to automatically form groups based upon users common interests. People with common interests can discuss common aims and work on projects together.

The invention will be better understood from the following detailed description and accompanying drawings.

BRIEF DESCRIPTION OF THE DRAWINGS

FIG. 7 is a List of Directives;

DESCRIPTION OF SPECIFIC EMBODIMENTS TERMS AS USED

Figure 1:
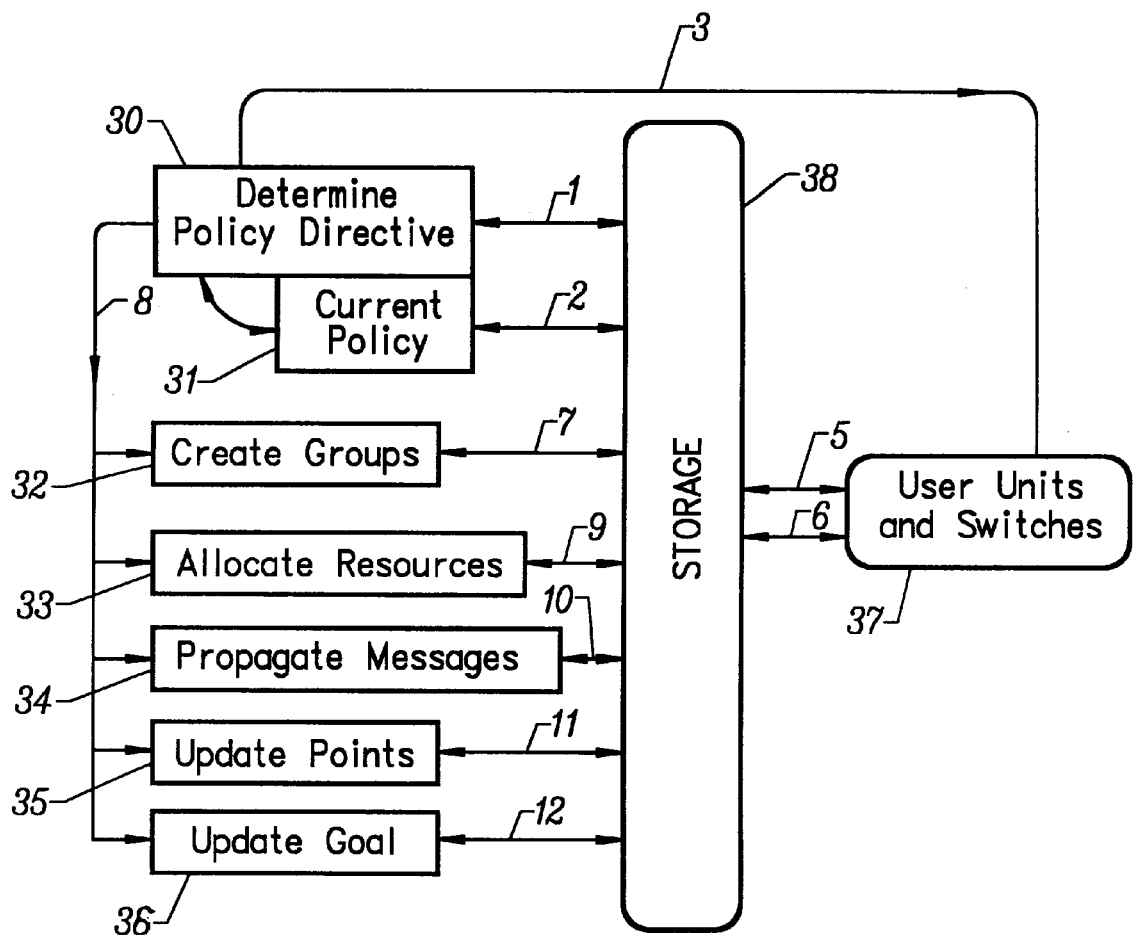
FIG. 1 is an overview diagram of the elements of the invention.

Participant (41): a person using the invention; also called "user".

Output Unit (39) takes either an analog signal or a digital message and produces human-detectable variations in the environment. For example, a television converts signals to viewable images; a speaker phone converts signals to vibrations you can hear. A personal computer can be a digital message output unit, because it can convert digital information into viewable text and image documents. Each participant has at least one output unit.

Input Unit (40) converts machine-detectable changes in the environment into analog signals or digital messages. For example, a microphone converts vibrations into analog signals. A personal computer combines input with output: the keyboard and mouse can be input units, the screen and speaker can be output units.

Switch (depicted by a circle pointed to by an arrow, the controlled portion of the switch, said circle surrounding two perpendicular lines which lead to the devices which are to be connected or disconnected): a device controlled by digital messages is proposed, committed to, completed or abandoned, and/or which takes an analog signal and uses it either to connect or to disconnect a given input device from a given output device. One input unit can be connected to several output units at the same time.

Resource: something in the real world which has value to participants; its limited availability can be expressed with a number. A person's time and money are good examples of resources.

Decision: a participant's elimination of at least one of a set of alternative choices. Participants can delegate decisions to proxies; proxies are computable functions of other participants' decisions.

Rating: a user's decision indicating their assessment of the fitness of a given item according to a given criteria. For example, indicating a song's entertainment value on a scale of 1 to 10.

Policy: the set of rules which determines under what conditions (including user decisions) the invention performs high-level actions such as propagating messages, switching connections, grouping participants, and allocating group-owned resources. We call such high-level actions directives.

Goal: actions proposed by participants, usually with associated time limits. They are analog signals with digital message summaries or exclusively digital messages. Goals are always in one of the following states: assigned, completed, abandoned, or verified. Since policy updates goals (36), it determines the procedural interpretations for the following goal states:

Assigned means a goal has been assigned to a list of participants.

Completed means that one or more participants have indicated the goal has been accomplished.

Abandoned means the goal isn't expected to be fulfilled.

Verified means that a trusted third party has verified the completion of a goal.

Points: for a given participant and category, points express the valuation of a contribution. For example, users may get a point for each dollar or hour users contribute to a cause, or lose points for failing to complete an assignment.

DETAILED DESCRIPTION

FIG. 1 shows an overview of an embodiment of the present invention. Exclusively computational processes are in square boxes, components with computational processes combined with physical components are in rounded boxes. Participants interface to the invention using input units, such as touch tone keypads and telephone microphones, and output units, such as computer screens. These units, combined with switches which can connect a subset of the input units to a subset of the output units, compose 37 and make it possible to send video and other signals directly from an input unit to other participants' output units.

Participants use 37 (computing devices combined with their input units and output units and associated switches) to obtain views of the stored state of the system 38. A set of processes (30, 32, 33, 34, 35, 36) update the storage device (s) 38 and the state of the switches based upon the currently selected policy 31 and input coming from the user's input and output units.

When policy (controlled by 30 and 31) indicates it is appropriate, the system performs directives (32–36). It creates groups 32, allocates resources 33, propagates messages so that they can be seen by more participants 33, updates the "points" associated with each participant 35, and indicates that an goal verified 36. Each of these processes is covered in additional detail in other figures.

Figure 2:
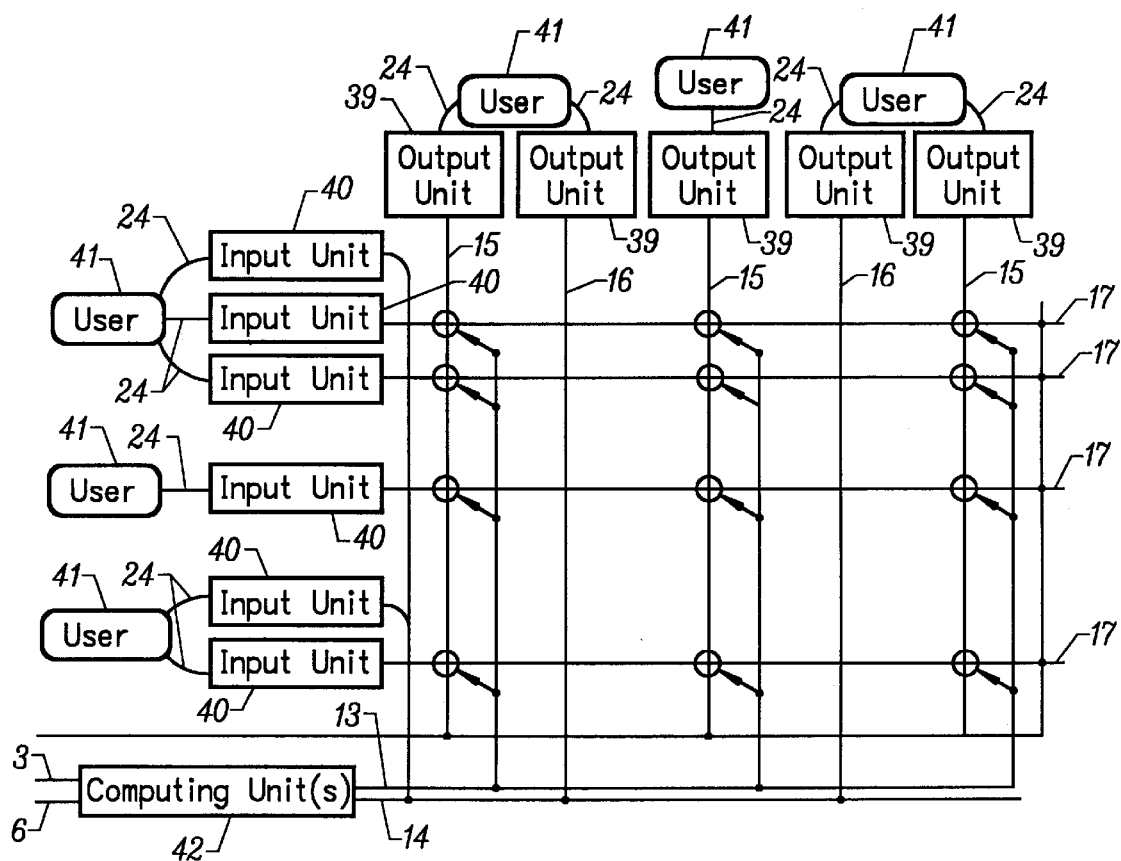
FIG. 2 is a diagram of the user devices and switches.

FIG. 2 shows an embodiment of the users, input units, output units, switches, and associated computing units in more detail.

The participating users, or participants are 41; each user has (via 24) corresponding input units 40 and output units 39. The input units 40 can be any kind of input device, such as a telephone microphone, computer keyboard, telephone touch pad, video camera, computer microphone, or motion detector. The output units 39 can be any kind of output device, such as video graphics array video screen, television screen, telephone speaker, computer printer.

Any compatible input device 40 can be switched (via 17) to provide its input to any number of compatible output devices 39 (via 15), which is controlled by the 42 computing unit(s) getting their control information from 30 via 3, or from 38 (FIG. 1) via 6.

Analog signals, such as video or voice, are routed via 5 to storage 38 so that signals from input units can be recorded as analog messages, and so that stored analog messages can be played back via the output units.

Digital information from digitizeable input units, such as telephone keypads or computer keyboards, is passed to a computing unit via 14; this information is then passed on to the storage facility (via 6) as a recorded message or is passed on to 30 (depicted in FIG. 1) via 3.

Figure 3:
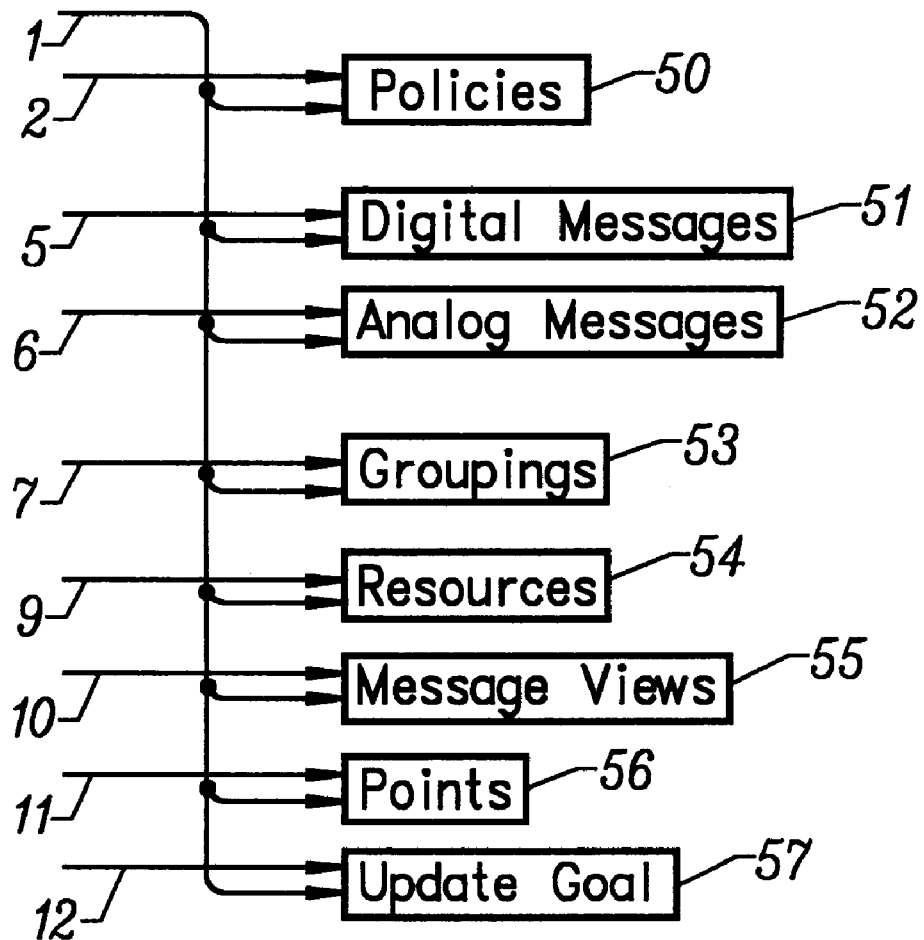
FIG. 3 is a diagram of storage elements or areas.

FIG. 3 shows an embodiment of storage areas within 38. Most of the storage areas in 38 are digital; there is a specific area dedicated to analog messages (52). The processes determining group directives 30 connect via 1 to access potentially all of the digital stored information in the storage unit in determining the directive; other processes access only information specific to their tasks, or perform other accesses through 30.

A policy (stored in 50), accessed via 2, consists of a computer program which determines how individual choices are combined to determine group behavior.

A group (stored in 53) consists of elements, each of which is either a participant or another group. Groups are accessed via 7.

Digital messages (stored in 51), accessed via 5, are structured streams of bits from input devices which can be relayed to output devices; for example, an e-mail message can be created by a computer keyboard and displayed using a video graphics array. Digital messages have one or more authors, have ratings indicating the decisions other group members have made relative to the message, have a subject, and have a thread with which they are associated.

Resources (stored in 54), accessed via 9, are designations of the assignment of real-world resources such as group time or money owned by the group.

When group policy indicates that a message should be propagated (via 10), the message views are updated. Message views (stored in 55) consist of sets of messages and list which groups and/or participants can see them. Goals are stored in 57.

Figure 4:
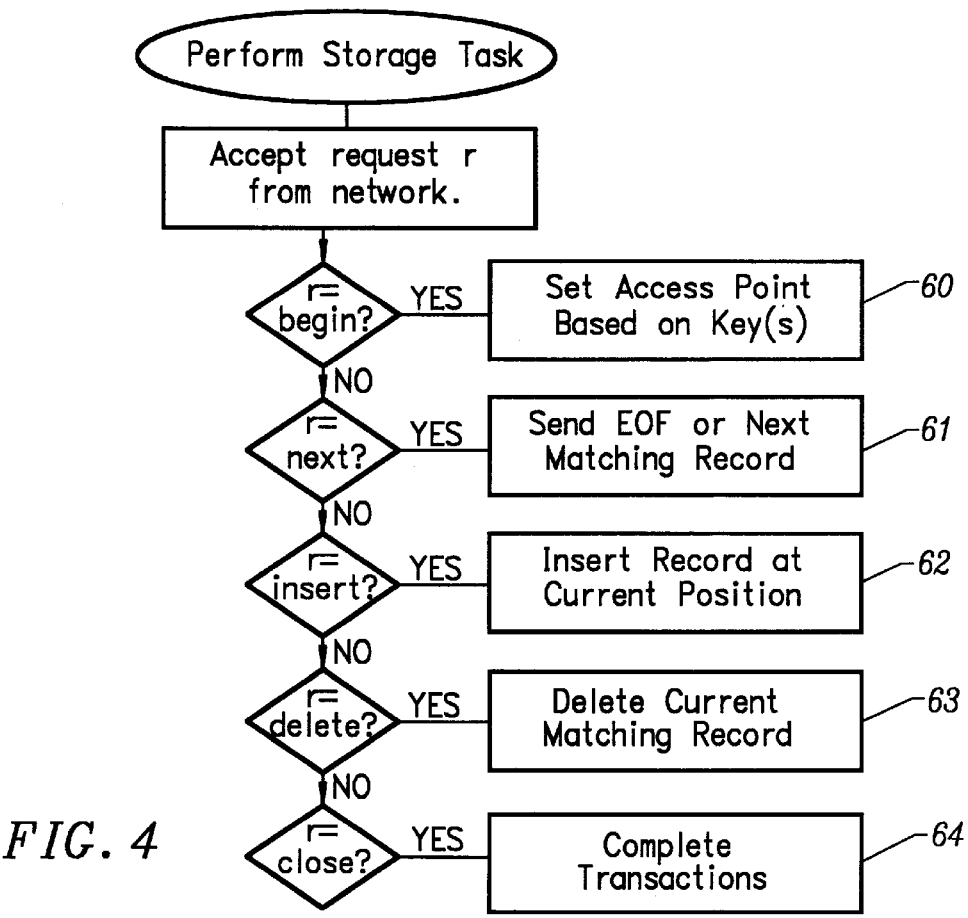
FIG. 4 is a flow chart of the storage algorithm.

FIG. 4 shows an embodiment of the method for storing information in the long-term storage device 38. Remember from FIG. 1 and 2 that analog signals are stored and retrieved on line 6, either in analog form or converted from analog to digital for storage purposes. Line 5 stores and retrieves digital messages. Within 38 is a computing apparatus consisting of one or more computing units connected to a network, a long-term storage device such as a hard disk drive. In FIG. 3, we see the basic steps for storing and retrieving information.

Records in the database consist of a set of attribute-value pairs; some of the attributes are keys, which means that it is possible to locate records in the database based upon those attributes. The rest of the attributes are stored with the record, but can not be used as the basis of a lookup.

The 60 operation, the begin-type request, sets the access point based upon a set of keys supplied as attribute-value pairs. For example, a request could come in as "last-name= Smith, first-name=John". This would make it so that next requests would be filled with records which have a first name of John and a last name of Smith. A begin request with "last-name=Smith, first-name=John, socsec=906-24-9817" would return records matching the additional social security record.

The 61 operation, for next-type requests, sends either an indication that there are no more records (EOF), or seconds the contents of the next matching record. The record sent back consists of the attribute-value pairs which were not specified in the request. To be valid, a 60 operation must precede a 61 operation without an intervening 64 operation.

The 62 operation inserts a record at the current point; it takes a set of attribute-value pairs as specified in the request, and inserts them into the indices so that future attribute-value accesses will find the record. To be valid, a 60 operation must precede a 62 operation without an intervening 64 operation.

The 63 operation deletes the current record and indicates whether there are matching records left, or whether that was the last record matching the current attribute-value keys. To be valid, a 60 operation must precede a 63 operation without an intervening 64 operation.

The 64 operation closes the current series of transactions, signaling the completion of a series of transactions in the database. To be valid, a 60 operation must precede a 64 operation without an intervening 64 operation.

Figure 5:
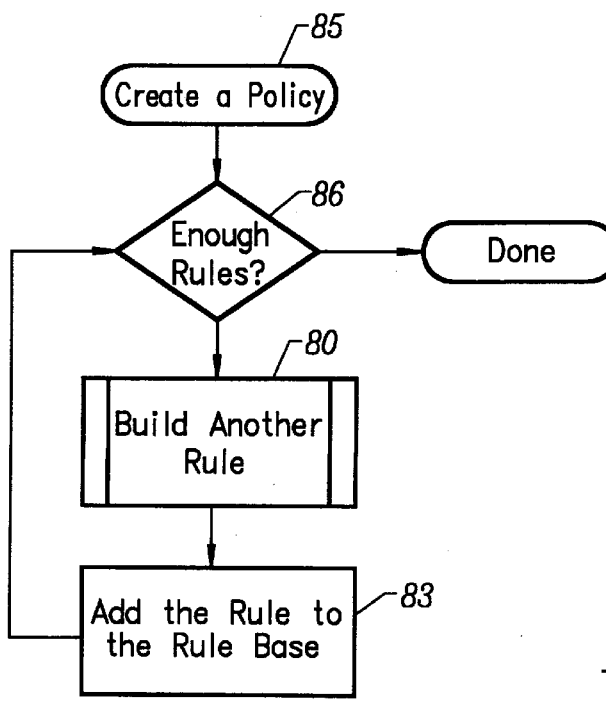
FIG. 5 is a flow chart for the function: Create a Policy.

FIG. 5 depicts an embodiment of the method for creating a policy 85 for the purpose of describing the composition of a policy. Rules are built 80 and added to the rule base 83 until there are enough rules 86.

Figure 6:
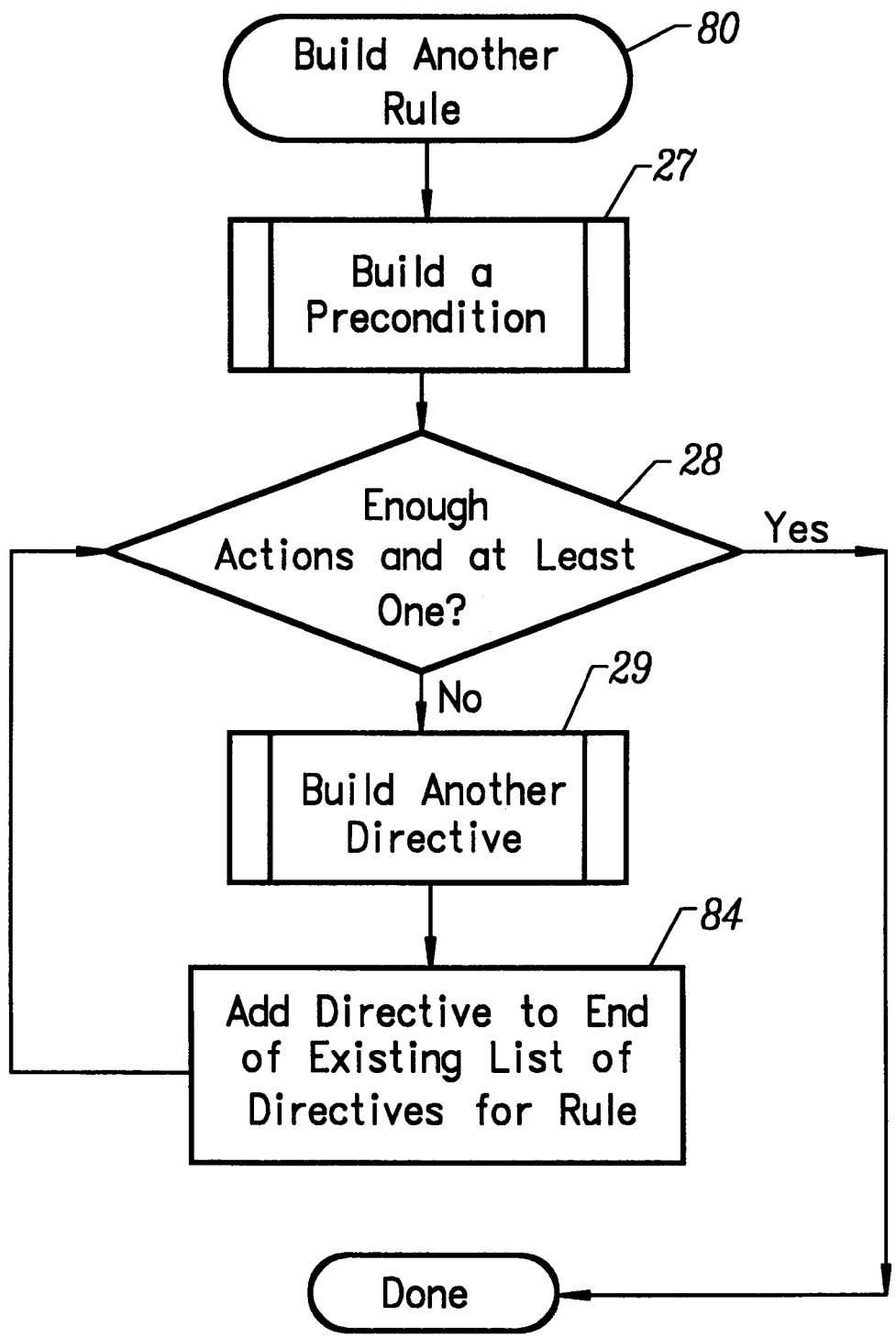
FIG. 6 is a flow chart for the function: Build Another Rule.

FIG. 6 depicts a more detailed embodiment of the method for building rules. First a precondition is constructed 27, and then a series of directives are built 29 and added on to the list of directives for the rule until you decide there are enough (but at least one) directives.

FIG. 7 depicts an embodiment of a list of possible directives, which are the high-level actions the invention performs when the policy rule's preconditions are satisfied. While 32–36 are directives depicted in detail elsewhere, directives 100–109 are described here. In addition to selecting a specific directive, these specifications are passed variable values which they can reference in the process of execution:

100 inserts or deletes a user from the invention, analogous to having the user log in or log off in Unix.

101 inserts a fact into the fact database which is accessible to rule preconditions. Facts consist of an attribute-value list which can be matched against at a future point in time; for example, to indicate John Smith is using a keyboard to express decisions one might say: "type= InputUnit, digital=true, device=keyboard, user= JohnSmith". The following facts are always available from the fact database: the list of participants along with their points; the list of resources and their amounts; group structure; goal state; each participant's list of input and output units, and some information about which input units can be meaningfully switch to connect to which output units, and about the nature of the digital messages coming from the digital input units. For retrieval of these facts, see the descriptions of 48 in FIG. 8 and 58 in FIG. 9. For deletion, see the next 102.

102 retracts a the first fact from the fact database which matches a pattern. When matching patterns, variables match anything and get assigned to their corresponding values. Here, we'll use a question mark suffix to designate variables. For example, if we retract "type=InputUnit, digital=true, device=keyboard, user=UNAME?", we end up assigning the variable UNAME? with the value "JohnSmith".

103 switches a specific input unit to connect or disconnect from a specific output unit. For example, a video camera may be disconnected from one of several television screens.

104 prints a message to specific digital output units. For example, after enough people have posted decisions that the policy rules can determine a result, a rule can print that result to everyone affected.

105 waits a specified period of time for a specific list of participants (or their proxies) to supply their decisions in digital form via input units. Once these are obtained, they are asserted into the fact base. For example John Smith's decision to vote no may be asserted into the fact base as follows: "decided=true, decision=voteNo, user=JohnSmith".

Figure 9:
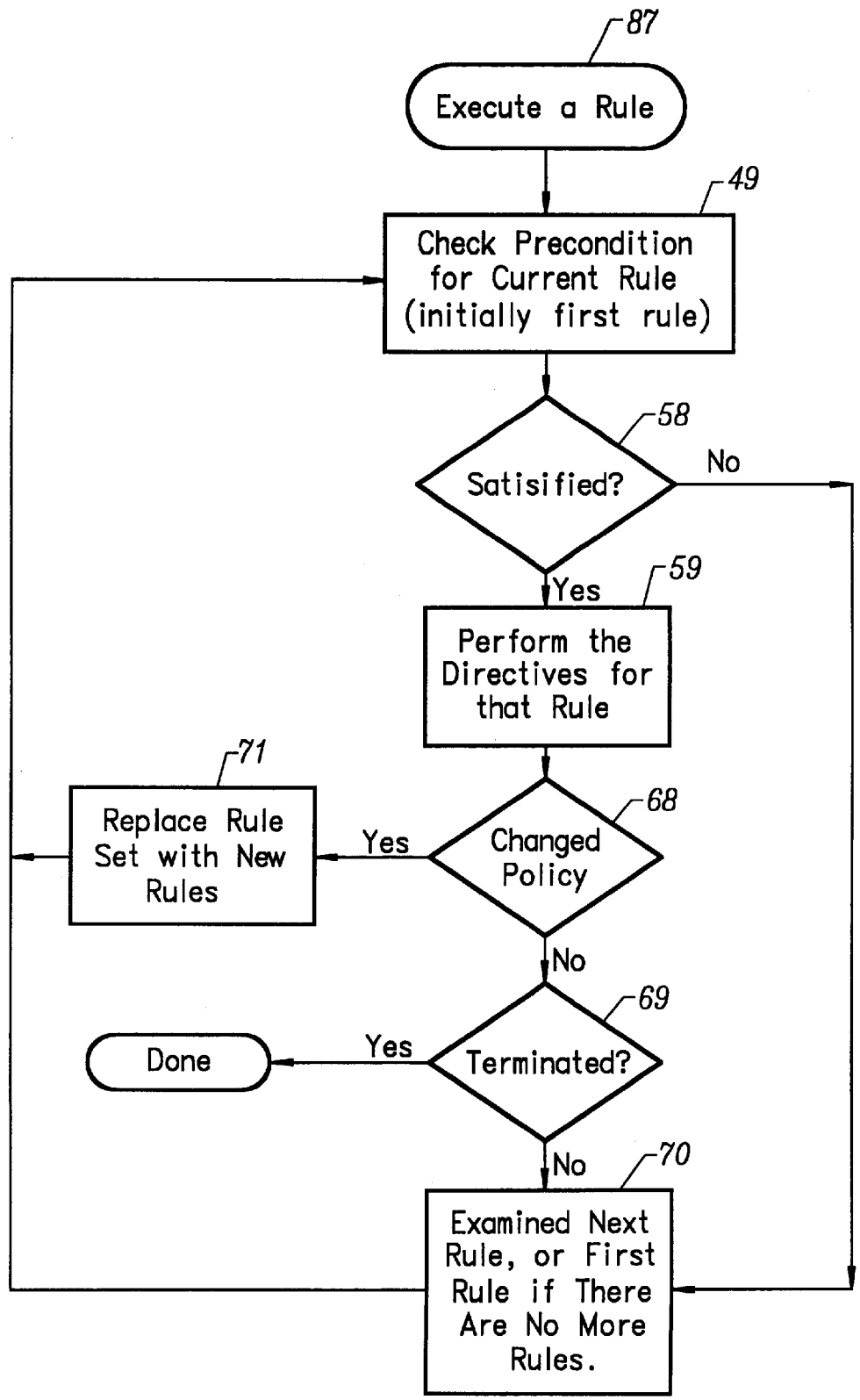
FIG. 9 is a flow chart for the function: Execute a Rule.

106 selects a new set of rules to be used instead of the current set (this is also shown in 71 of FIG. 9). The new policy rules are taken from a message. Typically, a policy will adopt a new set of rules only by a super-majority (⅔ decide yes). From this point on, the old rules are ignored and the new rules are used, unless they are also supplanted by this same directive. The current policy is also depicted as 31 in FIG. 1.

107 allows a user to delegate some or all of their decisions to a proxy, which is either a computer program they supply (for example in the programming language Java, with an interface defined for examining publicly available information such as others' decisions), or a specified other user.

108 assigns a variable to the result of a mathematical expression. The expression can include numeric constants, variables, addition, subtraction, multiplication, division, logarithms, exponentiation, comparisons (greater than, less than, or equal to, 0 if false, 1 if true), boolean operators (and, or, not, 0 expressing false, 1 expressing true), or the creation of a random number in the range 0 to 1. For example, if R? is 2 then N?=4*R?+1 would assign 9 to N?. The equality check additionally works for variables which aren't holding numbers, so that, for example, it's possible to determine if two input units have the same user.

109 signals the termination of the current execution of the policy.

110 permits recursion by satisfy a matching precondition from another rule. When 110 is used, only one directive is permitted for the entire rule in a fashion similar to rule execution in the programming language Prolog. To be compatible with Prolog, modify the handling of backtracking associated with the Prolog cut, conjunction, disjunction, and negation. In Prolog, matching is performed by unification. Unification matches part by part and succeeds only if all parts match. At each point, variables which have values are treated as if their value were put at that point; constants must match exactly (e.g. 1=1, Tom=Tom, Jessie≠Tom); variables which don't already have values get assigned to a constant value if that is what they are matched against; and two variables are matched by tying them together so that whenever either of the two original variables is assigned. As in Prolog, when a failure triggers backtracking, the variables which were assigned or tied together as part of that attempt to succeed are put back in their original state.

Figure 8:
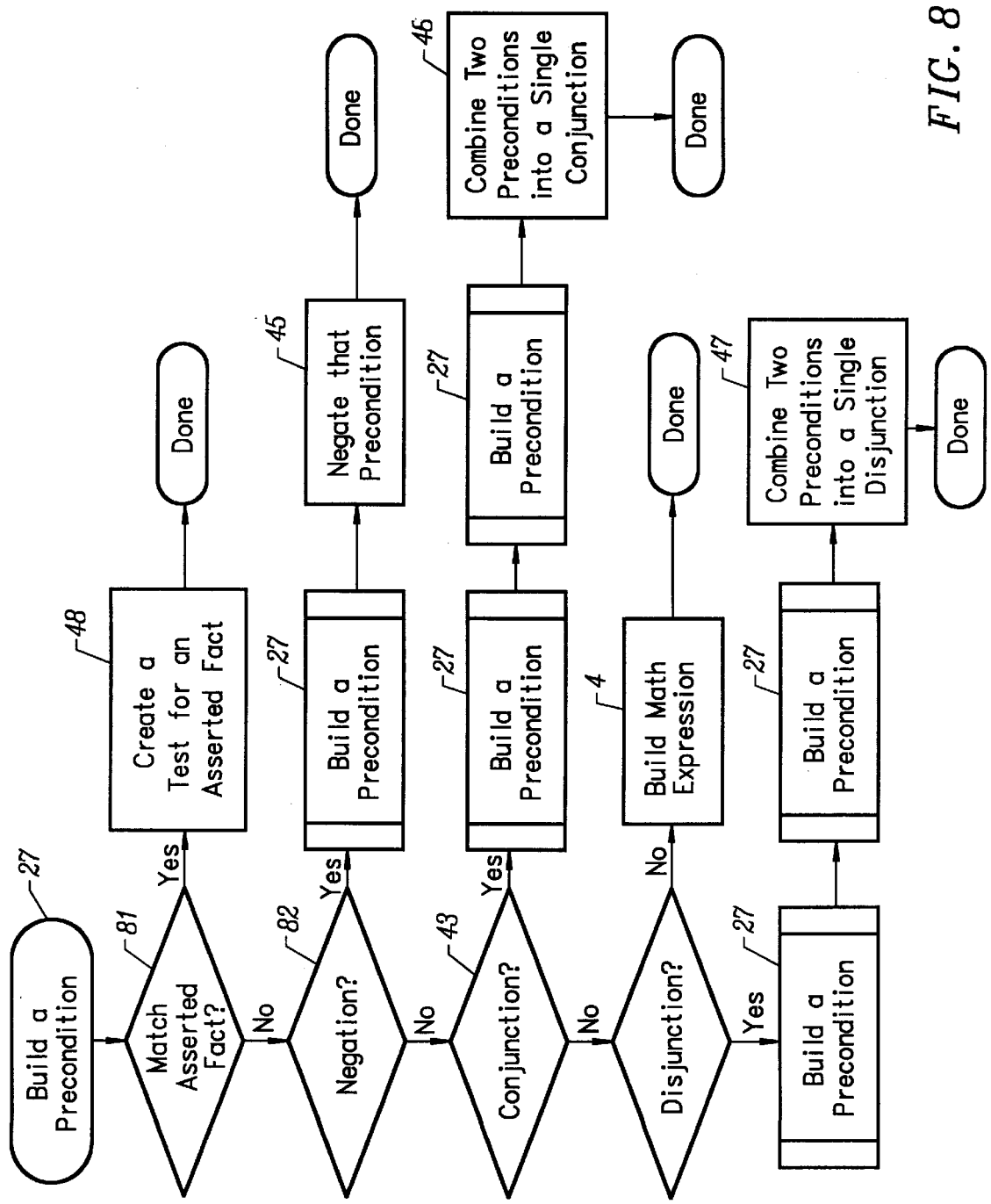
FIG. 8 is a flow chart for the function: Build a Precondition.

FIG. 8 depicts an embodiment of the method of building preconditions. Preconditions are composed of:

1. Testing for a fact in the database 48: when a rule is executed, such a test must match exactly the specified portions of a record; variables are placed in other positions within the record and are assigned if a match is found.

2. Negating another precondition 45: when a rule is executed, this precondition fails if the negated precondition succeeds, and this precondition succeeds if the negated precondition fails.

3. Building a conjunction from two other preconditions 46: when a rule is executed, this resulting precondition succeeds only if both of its included preconditions succeed. Building a disjunction from two other preconditions 47: when a rule is executed, this resulting precondition succeeds only if either of its included preconditions succeed.

4. A mathematical expression is always true, and exists only to assign variable values as described in 109 FIG. 7 above.

FIG. 9 describes an embodiment of the method of execution of a policy rule 87. The invention checks to see if the precondition for the current rule (initially, the first rule is taken) is satisfied. See FIG. 8's description to see how this is determined. If the precondition is satisfied 49, the directives for the rule are performed 59 in the same sequence they were built in FIG. 5. If the policy changed 68, which is to say that a new set of policy rules is going to be adopted, then the existing policy rule set is replaced by the proposed rule set taken from the corresponding digital message 71; after replacing the rules, the old rules are entirely discarded. If the rules are not replaced, the terminate directive is checked for 69; if the system should terminate, it ceases interpreting policy. Otherwise it examines the next rule in the rule database, or takes the first rule again if there are no more rules to consider 70.

Figure 10:
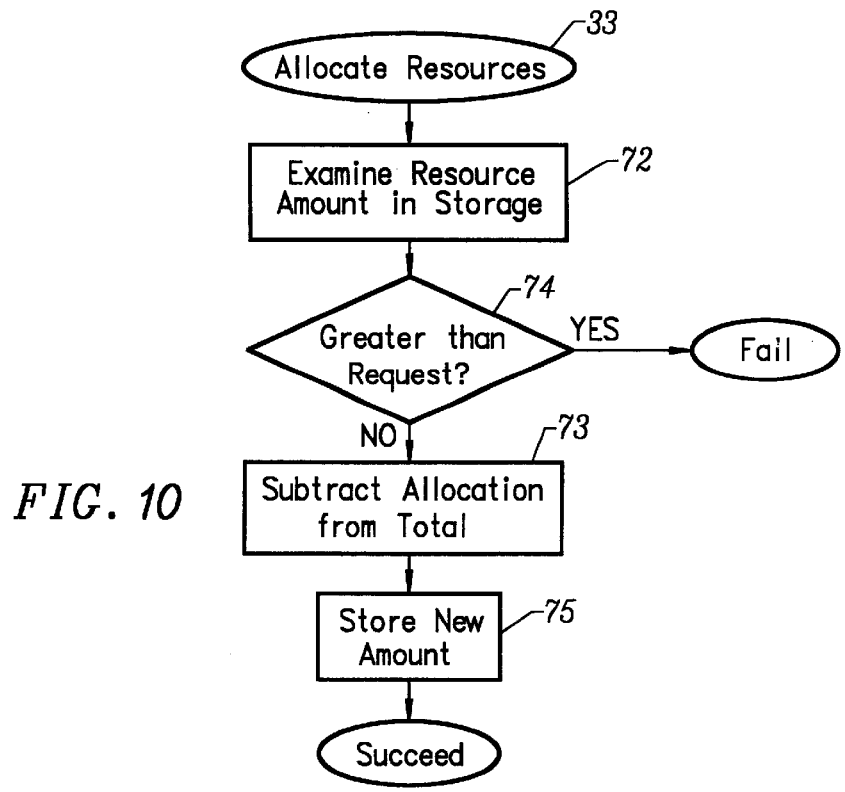
FIG. 10 is a flow chart for the function: Allocate Resources.

FIG. 10 describes an embodiment of the method of allocating resources 33. An example of a resource is money stored in a bank's computer system. To allocate a resource, the invention first examines the amount of the given resource in storage 72; if the amount that is present is greater than the amount requested 74, the amount is subtracted from the total 73, the amount is allocated (for example, in the case of money, a wire can be automatically issued assigning the money to a new person or agency), and the new remaining amount is stored 75.

Figure 11:
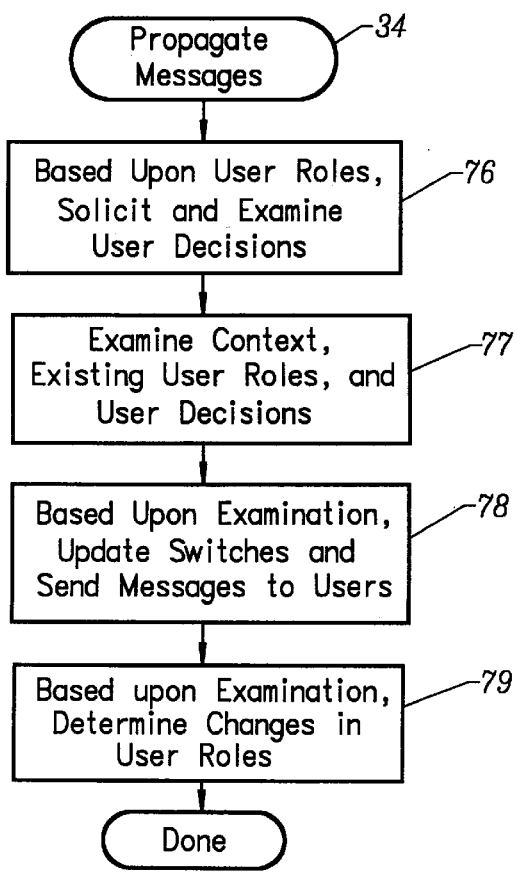
FIG. 11 is a flow chart for the function: Propagate Messages.

FIG. 11 describes an embodiment of the method of propagating messages 34.

Example 1.

128 participants are listening to a famous person speak. Each of them have questions. How do you determine which question gets asked next? The 128 participants are divided randomly into a binary tree of depth 7, so that at the lowest level you have groups of 2, at the next level you have groups of 4, at the next level 8, then 16, then 32, then 64, and finally 128 at the top. Participants propose questions. At each level, others look at the question and indicate how good they think it is on a scale of 1 to 10; if it is better than most alternative questions' ratings, the question is promoted to the next level. Thus, everyone doesn't have to rate everyone else's questions, only the ones that are selected. The question with the highest over-all rating gets posed to the famous person.

Example 2.

100 participants are doing an exercise in pairs; how can the session leader find a good example to bring to the attention of the rest of the participants? 10 participants can be selected based upon some criteria such as their previous experience as indicated by the number of points they have accumulated. 6 of the assistants then monitor the conversations of 7 to 8 pairs each; they select one conversation which would be of interest to the leader; 3 of the assistants choose from two of the selected conversations to decide which to pass up to the remaining assistant; and the remaining ranks the 3 in order from 1 to 3 and passes them on to the leader. The leader can then review the 3 conversations in storage, choose one, and play this conversation for the 90 participants.

The general case of propagating messages 34 consists of a series of steps. First, examine the existing user roles, soliciting user decisions such as ratings 76. Then, the context (set of facts currently in the fact database) is considered 77. Based upon a policy (such as propagate the best questions up to the next level), update the switches and propagate stored messages to a list of users 78. Also based upon these decisions and based upon policy (which may draw upon random numbers as well), change the facts associated with users to reflect policy 79. In example 1, if someone continually proposes poorly rated questions, you may want to exclude them from having future questions studied; or, you may want to promote some user so that their questions are automatically propagated to the next level.

Figure 12:
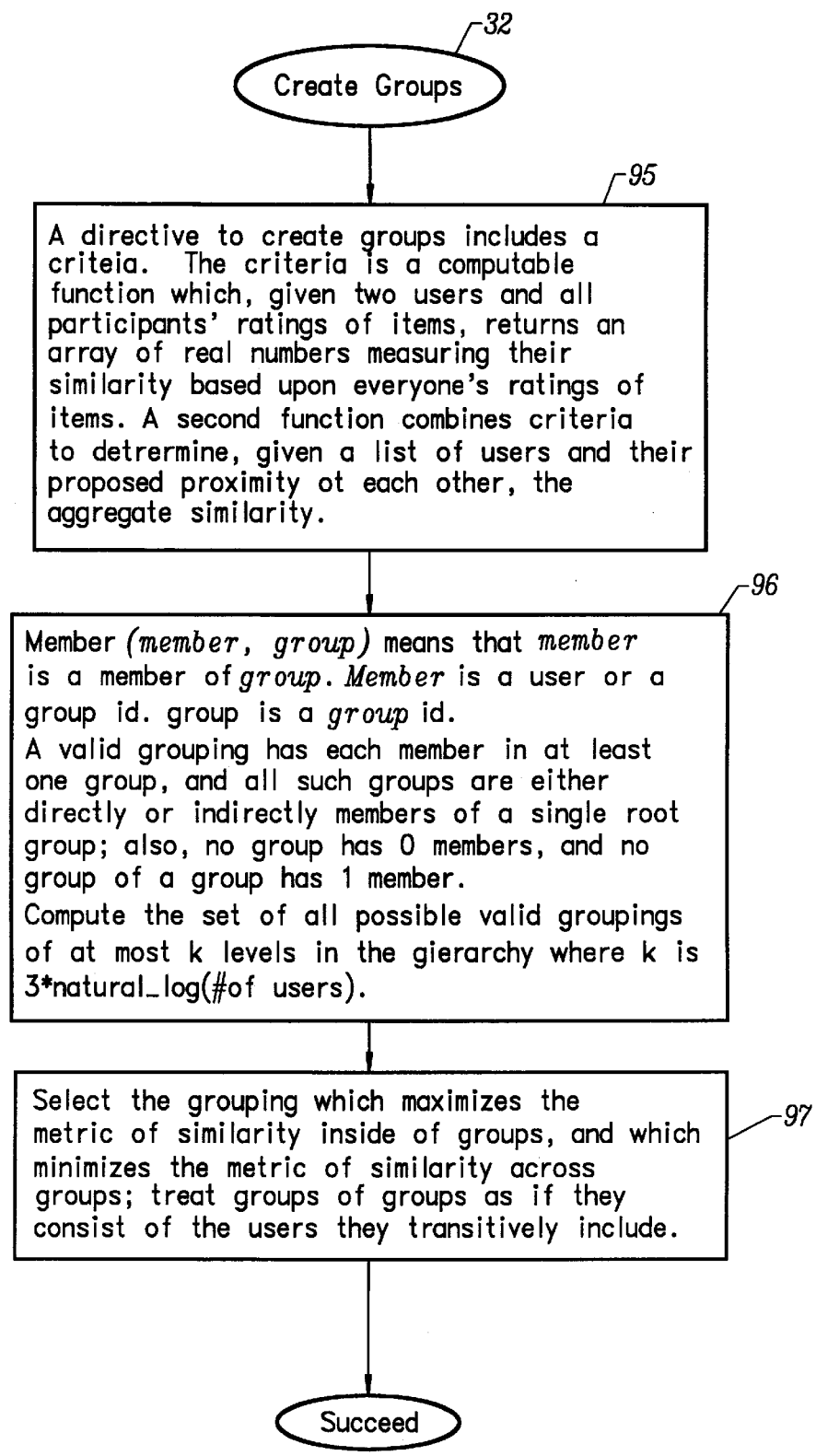
FIG. 12 is a flow chart for the function: Create Groups.

FIG. 12 illustrates an embodiment of the method of creating groups 32. 95 depicts constraints on the two key functions. A directive to create groups includes a pair-wise similarity metric. This is a computable function which, given two users and all participants' ratings of items, returns a vector of real numbers measuring their similarity based upon everyone's ratings of items. For example, it could simply subtract the difference in ratings between corresponding items which both users have rated, square the differences, and negate the sum of the squares to provide an array of one element depicting the metric of similarity. Beyond this single element, vectors can include additional categories of similarity; for example, two users could be considered similar in their ratings of rock groups, or movies, or political messages.

A second function combines criteria to determine, given user pairs and their proposed proximity, the aggregate similarity. This second function is described in more detail in a few paragraphs.

As described in 96, the member predicate, Member (member, group), is true or false depending upon whether or not member is a member of group. Member(member, group) means that member is a member of group. member is a user or a group id. group is a group id.

A valid grouping has each member in at least one group, and all such groups are either directly or indirectly members of a single root group; also, no group has 0 members, and no group of a group has 1 member.

Here is an example aggregate similarity metric: measure proximity so that if Member(user1, group1) and Member (user2, group1) then their proximity is 0; if that's not the case, but:

Member(user1, groupA) &

Member(user2, groupB) &

Member(groupA, groupC) &

Member(groupB, groupC)

then their proximity is 1; if neither of the first two conditions hold, but:

Member(user1, groupA) &

Member(user2, groupB) &

Member(groupA, groupC) &

Member(groupB, groupD) &

Member(groupC, groupE) &

Member(groupD, groupE)

then their proximity is 2; and so on.

So given k users with $2^k$ pair-wise results of applying the similarity criteria, one can sum the elements of each vector and multiply the result by $2^{d-p}$ where d is the depth of the tree and p is the proximity, summing all such results to define the aggregate similarity metric. Such a function will tend to be greater (less negative) for groups whose elements are more similar, and lower (more negative) for groups whose elements are more different. (In the group tree, we want close proximity within groups to qualitatively predict similarity.)

So step 96 computes the set of all possible valid groupings of at most k levels in the hierarchy where k is 2.718*natural_log(# of users) 96.

Of those groupings, step 97 selects the grouping which minimizes the aggregate metric of similarity. This grouping can then be made the basis for forming groups for conversations on common topics of interest, for selecting debating partners (choose users who are distant from each other in the grouping tree), or for forming groups to achieve shared aims such as cleaning up beaches.

Figure 13:
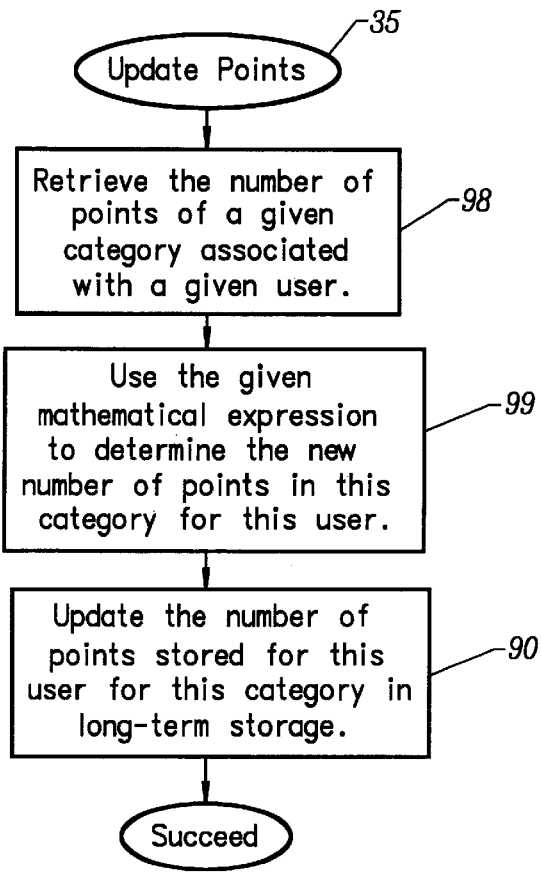
FIG. 13 is a flow chart for the function: Update Points.

In FIG. 13, to update points 35, the invention first retrieves 98 the number of points of a given category which is associated with the given user in the long-term storage (56 in FIG. 5). Then it uses the given mathematical expression to determine the new number of points 99. Then the number of points is updated in long term storage 90. Points are used to keep track of users' reputations. For example, if they commit to clean a beach and they do it, policies will typically facilitate the process of their being rewarded by others with points; if they commit to that goal but abandon the goal, most policies will facilitate their loss of points.

Figure 14:
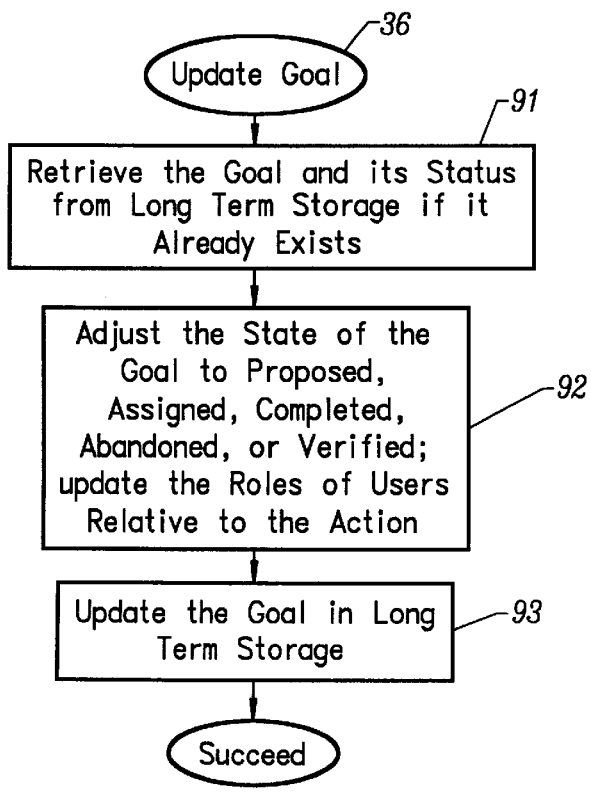
FIG. 14 is a flow chart for the function: Change Action State.

FIG. 14 charts an embodiment of the method of updating goal state 36. A goal is first proposed in the form of a digital message or analog signal from a contributor's input unit; depending upon how the policy rules are written, other users see the goal and make decisions leading the rules to change the goal's state. The goal's state consists of its status and the list of users assigned to the goal, along with a description of the portion of the goal they themselves are responsible for.

The method for updating goal state is as follows: first, the goal and its associated state is retrieved from storage if it's not newly proposed and if it's not an analog signal; if it is an analog signal, only the state information is retrieved. In step 92, the state of the goal is assigned to one of the following states, or to some additional state defined according to policy: proposed, assigned, completed, abandoned, or verified. At this time, the list of users and the roles they play in fulfilling the goal is also updated. Then the information in the long-term storage (57 in FIG. 5) is updated 93. For example, a user may use their microphone input unit to voice the goal "remove all cans and bottles from $40^{th}$ street beach in Santa Cruz".

System Overview

Figure 15:
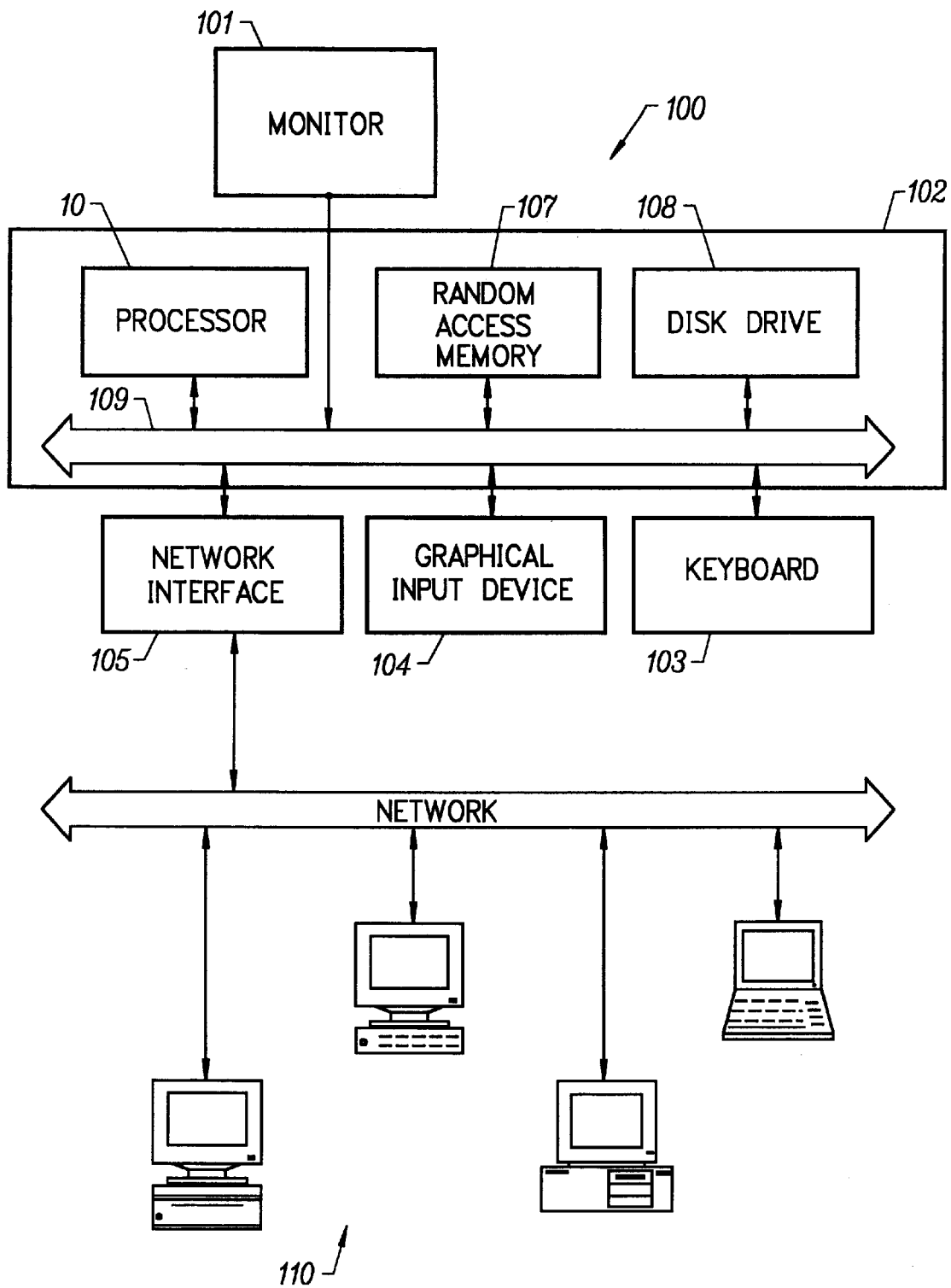
FIG. 15 is a block diagram of a system according to a preferred embodiment of the present invention.

FIG. 15 is a block diagram of a system 100 according to an embodiment of the present invention. System 100 includes a monitor 101, a computer 102, a keyboard 103, a graphical input device (for example, a mouse, optional) 104, and a network interface card 105. Computer 102 includes familiar computer components such as a processor 106, and memory storage devices, such as a random access memory (RAM) 107, a disk drive 108, and a system bus 109 interconnecting the above components.

A mouse is but one example of a graphical input device 104, also known as a pointing device, a digitizing tablet is another. RAM 107 and disk drive 108 are examples of tangible media for storage of messages, computer programs, etc. Other types of tangible media include floppy disks, removable hard disks, optical storage media such as CD-ROMS and bar codes, semiconductor memories such as flash memories, read-only-memories (ROMS), ASICs, and battery-backed volatile memories, and the like. Network interface card 105 may be any conventional interface means such as a modem, an Ethernet interface card, and the like.

In an embodiment, System 100 includes a 586 microprocessor-class based computer, running Microsoft Windows95™ operating system, and software available from the Inventor.

As illustrated in FIG. 15, any number of users using computers 110 are coupled to system 100 via any conventional network in order to pass messages back and forth, and the like. In the preferred embodiment, users using computers 110 communicate to system 100 via any conventional Internet browser such as Netscape Navigator using, for example, TCP/IP.

FIG. 15 is representative of but one type of system for embodying the present invention. It will be readily apparent to one of ordinary skill in the art that many system types and configurations are suitable for use in conjunction with the preferred embodiment of the present invention.

Additional Aspects of the Invention:

In light of the foregoing disclosure, it is believed that one of ordinary skill in the art will be able to implement the below functionality, and other functionality not described below.

In addition to the method described here of sending digital messages from computing unit to computing unit, network broadcast technology such as UDP to send digital messages from one computing unit to many to reduce networking overhead could also be used.

Also, we conditionally encrypt the digital messages using traditional encryption technology such as DES to increase security.

Also, we conditionally encrypt the digital messages using public key encryption such as RSA. Such a technology makes it possible to encrypt digital messages knowing a public key, said encrypted messages which can only be decrypted using a separate private key.

Also, we conditionally compress digital messages to decrease the bandwidth required for compression.

Also, we authenticate decisions and digital messages using digital signatures to increase security, particularly important in allocating resources.

Also, meeting participants can use the invention to send documents or designators (such as URL's as used by Netscape's browser) to convey information during the meeting.

In another embodiment, a message indicating a course of action is proposed. In response, the users in a group communicate to the system a vote indicating their degree of commitment to performing the action described by the message. At a future point in time, users communicate the status of other users, or themselves, in performing the actions. For example, as indicated earlier, the actions may be completed, abandoned, not completed, etc. Then, in response to the status of the actions, the system assigns a number of points to user in response to the policy and to the status. Such a point value would serve to indicate, for example, the commitment level of a user, the number of actions committed to by a user, the number of actions completed by the user, etc.

In another embodiment, where users post messages, users are able to "acknowledge" each other instead of simply rating each others messages. As discussed in the background, with typical rating systems, most messages are rated lowly, thus users typically loose interest in posting messages. As an alternative, in the present embodiment, if another users likes a message they direct the system to give the author a point, or two points if the other really likes the message. Thus for each message posted, the user obtains only positive feedback. It has been found in practice that most constructive messages get at least about 20 points, which makes the author of the message feel heard.

An additional feature of the above embodiment, is that the system forwards messages to the user the system predicts the user will value, based upon the user's previous ratings and the message ratings. Further, accumulated message point scores of a user can be used for other purposes, such as grouping highly rated users into special working groups. Such a scheme allows users to contribute to a group and be recognized if other users value their contributions.

As an example, suppose there is a group of users dedicated to saving trees that wishes to acknowledge the value of what each user is contributing. To enhance the interest of users in responding to messages or queries, the system can be implemented with a policy that a positive response results in a directive that a small amount of money, for example 10 cents, be donated to a selected organization, such as Green-Peace. Because, real money is involved, group members may feel more interested in responding to messages. As a further example, the system can be implemented with a policy that users can also directly buy "acknowledgment points", with the directive that some other donation be performed. Because the Internet incorporates a world wide base of users, the number of responses to messages or acknowledgment points is potentially very large, thus the amount of donation is potentially very large. By providing the above system, aggregate control of the electronic control is facilitated.

Another embodiment, of the present invention focuses upon the tendency of users to focus on talk rather than on action. In this embodiment, a group of people who share a common interest, such as writing, can commit to do a certain amount of writing, such as 10 pages per week. The system can thus be implemented with a policy that users indicate their degree of success against the group goal, with a directive that users be rated upon their progress. Users who do not meet their goal, for example, can then be arraigned into a sub-group that focuses discussion upon what helped and hurt their progress. By focusing on progress against an action, groups with shared interest on the Internet can do less talking and more completely fulfill their goals.

As disclosed in some embodiments above, the system may be implemented with a policy based upon the ratings of messages, the ratings of authors, and the ratings of raters, wherein the directive is to sub-segment the users based on such ratings or combination of such ratings. For example, if a large group of Unix users rate exchanged messages, the system may identify a smaller group of users who tend to rate each others' messages highly, and in response create a smaller group (of Unix wizards) allowing for a higher-quality conversation between those members. Further, the system may identify a group of users who tend to "flame" and remove them from the group. The system thus regulates and enhances group dynamics based upon the policies.

As stated above, policies can typically be changed by the group. For example, a group may begin with a policy and directives controlled by Robert's Rules of order, and then make and implement a motion to change the policy to majority-rule for each decision.

Another embodiment is used to build consensus. For example, in a typical on-line interview of a famous person, such as like Madonna, users are typically selected at random to ask questions. By implementing the present system, users could propose a question to the interviewee within a subgroup and in response, users can vote on different proposed questions. The question that is chosen as the best for a subgroup can then be submitted to a wider group of users for rating, and so on. As a result, the system submits questions that most people agree upon to Madonna.

In another embodiment, it is possible to have two users debate (e.g. Republican and Democratic champions), and have other users on the sidelines rate the messages composing the conversation. Further, one can even bet legally by having money put into a pot which will be donated to one group or another based upon who wins the debate.

In yet another embodiment, consider the difficulty people currently have in working video conferencing systems. With a large number of users, the issue is whose image and voice should be transmitted to others. If everyone's image is transmitted, the system can automatically broadcast the person who has the "floor" as the largest image on a display. The system uses Roberts Rules of Order to decide whose face and voice is transmitted at a particular time to all of the other users. For example, users can raise objections and request to speak in the debate by giving feedback, such as touching a telephone keypad. The feedback is preferably not transmitted to all of the other users, instead the system automatically queues the feedback while some other user has the floor. Typically, only when the user who has the floor yields, can the objector then be heard.

Non-trivial control of an electronic network is facilitated by the above embodiments. Examples of trivial control systems include a "dictator" model and a "unanimous" model. Under a dictator model, although many users in a group may vote against a plan of action, a superior user may decide to follow that plan of action; under a unanimous model, only when all users in the group agree to a plan of action, then will that plan of action be adopted. As illustrated, the system provides the ability to implement different rules and executes different directives and thus provides aggregate control of electronic networks.

Conclusion

In the foregoing specification, the invention has been described with reference to specific exemplary embodiments thereof. Many changes or modifications are readily envisioned, for example, the network may be a local area network, an intranet, or any other network of users, such as the Internet. Further, any conventional programming language could be used to implement the above described functionality, such as C, C++, Java, and the like. Further many apparatus incorporating embodiments of the present invention are anticipated, for example, personal computers, workstations, network PCs, etc.

The specification and drawings are, accordingly, to be regarded in an illustrative rather than a restrictive sense. It will, however, be evident that various modifications and changes may be made thereunto without departing from the broader spirit and scope of the invention as set forth in the claims. Further, any imaginable rule and directive could be implemented by the present system, thus the above describes rules and directives are merely exemplary.

I claim:

1. A method for facilitating achievement of a group goal of a plurality of users on an electronic network comprises:
   identifying the group of users from a plurality of users;
   determining the group goal in response to input from a first user from the group of users;
   determining a policy for the group of users, the policy including decision criteria and directive actions;
   receiving input from a second user from the group of users;
   determining whether a decision criterion is met in response to the input; and
   performing a directive action to facilitate achievement of the group goal when the decision criterion is met.

2. The method of claim 1 wherein the directive action comprises allocating resources.

3. The method of claim 1 wherein the directive action comprises transferring funds.

4. The method of claim 1 wherein the directive action comprises propagating messages to particular users.

5. The method of claim 1 wherein a point value is associated with each user in the group of users, and
   wherein the directive action is modifying a point value of a user in the group of users.

6. The method of claim 1 wherein the directive action comprises updating a status for a goal.

7. The method of claim 1 wherein the directive action comprises coupling an analog input unit to an output unit.

8. The method of claim 1 wherein the directive action comprises forming another group of users from the plurality of users.

9. The method of claim 1 wherein the directive action comprises changing the policy.

10. The method of claim 1 wherein the receiving input comprises:
    propagating a message from the first user within the group of users; and
    receiving a rating of the message from the one user within the group of users.

11. The method of claim 10 wherein the receiving the rating further comprises determining a rating for the first user in response to the rating of the message.

12. The method of claim 1 wherein the step of creating the group of users comprise the steps of:
    determining a criteria for the group of users;
    determining ratings for users from the plurality of users in response to the criteria; and
    determining the group of users in response to the ratings.

13. The method of claim 12 wherein the step of determining the group of users comprises:
    determining a first group of users from the plurality of users;
    determining a first rating for the first group of users in response to the criteria;
    determining a second group of users from the plurality of users;
    determining a second rating for the first group of users in response to the criteria; and
    selecting the first group of users as the group of users when the first rating exceeds the second rating.

14. The method of claim 1 wherein the step of determining the policy comprises the steps of:
    providing at least one precondition for the decision criteria; and providing at least one directive action when the decision criteria is met.

15. The method of claim 14 wherein the one precondition comprises determining whether the role of the user within the group meets a particular criteria; and wherein the one directive action comprises forwarding a message from the user to other users in the group.

16. The method of claim 1 wherein the policy comprises Robert's Rules of Order.

17. A method for facilitating a group goal of a group of users comprises:

identifying the group of users;

determining the group goal in response to input from a first user from the group of users;

determining a control policy and a policy result for the group of users, the control policy including rules and the policy result includes directives such that a directive is performed in response to satisfying more than one rule;

receiving a vote from a second user from the group of users;

determining whether a rule within the control policy is satisfied in response to the vote from the second user; and performing the directive to facilitate the group goal when the rule is satisfied.

18. The method of claim 17 wherein the control policy requires that for each user, for each vote the user can make, there exists votes which other users could make which would result in a different policy result.

19. The method of claim 17 wherein the control policy requires that if a unanimous vote results in performing the directive, then there must be some other combination of votes which also results in performing the directive.

20. A method for controlling an electronic network for a group of users from a plurality of users, the method comprising the steps of:

identifying the group of users from the plurality of users;

providing a message from a first user within the group of users;

receiving input from a second user within the group of users in response to the message; and updating a point value for the first user in response to the input.

21. The method of claim 20 wherein the message indicates a degree of commitment by the user in performing an action; the method further comprising the steps of:

receiving a status of the action from the user; and updating the point value for the first user in response to the status.

22. A computer system for facilitating achievement of a group goal of a plurality of users on an electronic network comprises:

means for identifying the group of users from a plurality of users;

means for determining the group goal in response to input from a first user from the group of users;

means for determining a policy for the group of users, the policy including decision criteria and directive actions;

means for receiving input from a second user from the group of users;

means for determining whether a decision criterion is met in response to the input; and means for performing a directive action to facilitate achievement of the group goal when the decision criterion is met.

23. A computer program product for a computer system including a processor for facilitating achievement of a group goal of a plurality of users on an electronic network comprises:

a computer readable media comprising:

code that directs the processor to identify the group of users from a plurality of users;

code that directs the processor to determine the group goal in response to input from a first user from the group of users;

code that directs the processor to determine a policy for the group of users, the policy including decision criteria and directive actions;

code that directs the processor to receive input from a second user from the group of users;

code that directs the processor to whether a decision criterion is met in response to the input; and code that directs the processor to perform a directive action to facilitate achievement of the group goal when the decision criterion is met.

* * * * *